US011430384B2

(12) United States Patent
Blank et al.

(10) Patent No.: US 11,430,384 B2
(45) Date of Patent: *Aug. 30, 2022

(54) CONTROL SCHEME FOR A SCANNING DISPLAY

(71) Applicant: Meta Platforms Technologies, LLC, Menlo Park, CA (US)

(72) Inventors: William Thomas Blank, Bellevue, WA (US); Ilias Pappas, Cork (IE)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,807

(22) Filed: Mar. 17, 2021

(65) Prior Publication Data
US 2021/0210011 A1    Jul. 8, 2021

Related U.S. Application Data

(63) Continuation of application No. 16/274,143, filed on Feb. 12, 2019, now Pat. No. 10,971,061.

(30) Foreign Application Priority Data

Jan. 11, 2019   (GR) .............................. 20190100026

(51) Int. Cl.
*G09G 3/02*      (2006.01)
*G02B 26/10*     (2006.01)
(Continued)

(52) U.S. Cl.
CPC ........... *G09G 3/3225* (2013.01); *G02B 26/10* (2013.01); *G06F 3/013* (2013.01); *G06F 9/30043* (2013.01); *G09G 3/02* (2013.01)

(58) Field of Classification Search
CPC ............. G09G 3/025; G09G 2320/064; G09G 2320/0646; G09G 3/02; G09G 3/34;
(Continued)

(56) References Cited

U.S. PATENT DOCUMENTS 4,609,927 A    9/1986  Yoshida
4,855,760 A    8/1989  Kanayama
(Continued)

FOREIGN PATENT DOCUMENTS

CN    111527538        8/2020
CN    112166469 A      1/2021
(Continued)

OTHER PUBLICATIONS

U.S. Non-Final Office Action dated Feb. 20, 2020 in U.S. Appl. No. 16/178,505.
(Continued)

*Primary Examiner* — Lixi C Simpson
(74) *Attorney, Agent, or Firm* — Weaver Austin Villeneuve & Sampson LLP

(57) ABSTRACT

Techniques are described for operating a display system comprising a light source, a scanning assembly, and a controller. The light source includes a plurality of emitters arranged in a column. The scanning assembly includes a reflective surface. A control signal including linear or sinusoidal pulses is applied to cause the reflective surface to rotate. The controller drives the emitters in sequence, using a same image data value, and in synchronization with the rotating of the reflective surface such that light emitted by different emitters of the plurality of emitters is reflected onto a same pixel of an output image. Changes in rotational speed are compensated for through increasing an emission duration for a first row driven while the reflective surface is rotating at a slower rotational speed, relative to an emission
(Continued)

duration for a second row driven while the reflective surface is rotating at a faster rotational speed.

20 Claims, 15 Drawing Sheets

(51) Int. Cl.
*G09G 3/3225* (2016.01)
*G06F 9/30* (2018.01)
*G06F 3/01* (2006.01)

(58) Field of Classification Search
CPC ...... G09G 3/3225; G02B 26/10; G06F 3/013; G06F 9/30043
See application file for complete search history.

(56) References Cited

U.S. PATENT DOCUMENTS

| | | | |
|---|---|---|---|
| 5,331,333 | A | 7/1994 | Tagawa et al. |
| 5,612,728 | A | 3/1997 | Kun et al. |
| 5,710,506 | A | 1/1998 | Broell et al. |
| 6,720,942 | B2 | 4/2004 | Lee et al. |
| 6,771,232 | B2 | 8/2004 | Fujieda et al. |
| 7,355,574 | B1 | 4/2008 | Leon et al. |
| 10,861,380 | B2 | 12/2020 | Horowitz et al. |
| 10,930,188 | B2 | 2/2021 | Blank et al. |
| 10,937,348 | B2 | 3/2021 | Blank et al. |
| 10,971,061 | B2 * | 4/2021 | Blank ............ G02B 26/101 |
| 2004/0251973 | A1 | 12/2004 | Ishida et al. |
| 2007/0080905 | A1 | 4/2007 | Takahara |
| 2007/0242002 | A1 | 10/2007 | Kawabe |
| 2009/0040198 | A1 | 2/2009 | Lu et al. |
| 2009/0051712 | A1 | 2/2009 | Arai et al. |
| 2010/0026214 | A1 | 2/2010 | Nagumo |
| 2010/0124438 | A1 | 5/2010 | Nagumo |
| 2011/0043541 | A1 | 2/2011 | Cok |
| 2011/0234741 | A1 | 9/2011 | Nagumo |
| 2013/0169697 | A1 | 7/2013 | Park et al. |
| 2013/0222774 | A1 * | 8/2013 | Chikaoka ............ H04N 9/3135 353/85 |
| 2015/0077414 | A1 | 3/2015 | Yoo et al. |
| 2015/0186098 | A1 | 7/2015 | Hall |
| 2015/0243068 | A1 | 8/2015 | Solomon |
| 2016/0198533 | A1 | 7/2016 | Williams et al. |
| 2016/0252742 | A1 | 9/2016 | Wakabayashi |
| 2016/0330418 | A1 | 11/2016 | Nakai et al. |
| 2017/0214907 | A1 | 7/2017 | Lapstun |
| 2017/0236463 | A1 | 8/2017 | Chi et al. |
| 2018/0182279 | A1 | 6/2018 | Sakariya et al. |
| 2019/0064526 | A1 | 2/2019 | Connor |
| 2019/0094667 | A1 | 3/2019 | Morality et al. |
| 2019/0156720 | A1 | 5/2019 | Blank et al. |
| 2019/0156721 | A1 | 5/2019 | Blank et al. |
| 2019/0347981 | A1 | 11/2019 | Horowitz et al. |
| 2020/0184868 | A1 | 6/2020 | Shen et al. |
| 2020/0226977 | A1 | 7/2020 | Blank et al. |
| 2020/0372846 | A1 | 11/2020 | Blank et al. |

FOREIGN PATENT DOCUMENTS

| | | |
|---|---|---|
| EP | 2610846 | 7/2013 |
| EP | 3151226 | 4/2017 |
| EP | 3794579 | 3/2021 |
| JP | 2021523393 A | 9/2021 |
| KR | 20210005278 | 1/2021 |
| WO | 2016196390 | 12/2016 |
| WO | 2019103821 | 5/2019 |
| WO | 2019222229 | 11/2019 |

OTHER PUBLICATIONS

U.S. Final Office Action dated Jul. 6, 2020 in U.S. Appl. No. 16/178,505.
Notice of Allowance dated Oct. 22, 2020 in U.S. Appl. No. 16/178,505.
U.S. Non-Final Office Action dated Feb. 20, 2020 in U.S. Appl. No. 16/178,510.
U.S. Final Office Action dated Jul. 7, 2020 in U.S. Appl. No. 16/178,510.
Notice of Allowance dated Oct. 23, 2020 in U.S. Appl. No. 16/178,510.
U.S. Non-Final Office Action dated Mar. 9, 2020 in U.S. Appl. No. 16/410,620.
Notice of Allowance dated Jul. 27, 2020 in U.S. Appl. No. 16/410,620.
U.S. Non-Final Office Action dated Jul. 9, 2020 in U.S. Appl. No. 16/274,143.
U.S. Notice of Allowance dated Nov. 25, 2020 in U.S. Appl. No. 16/274,143.
U.S. Non-Final Office Action dated Apr. 1, 2021 in U.S. Appl. No. 16/761,767.
International Application No. PCT/US2019/032237, International Search Report and Written Opinion dated Jul. 30, 2019.
International Application No. PCT/US2019/032237, International Preliminary Report on Patentability dated Nov. 17, 2020.
International Application No. PCT/US2018/058804, International Search Report and Written Opinion dated Feb. 21, 2019.
International Application No. PCT/US2018/058804, International Preliminary Report on Patentability dated May 26, 2020.
EP Application No. 19732768.7, "Communication Pursuant to Article 94(3) EPC", dated Jun. 14, 2021, 8 pages.
U.S. Notice of Allowance dated Jul. 16, 2021 in U.S. Appl. No. 16/761,767.

* cited by examiner

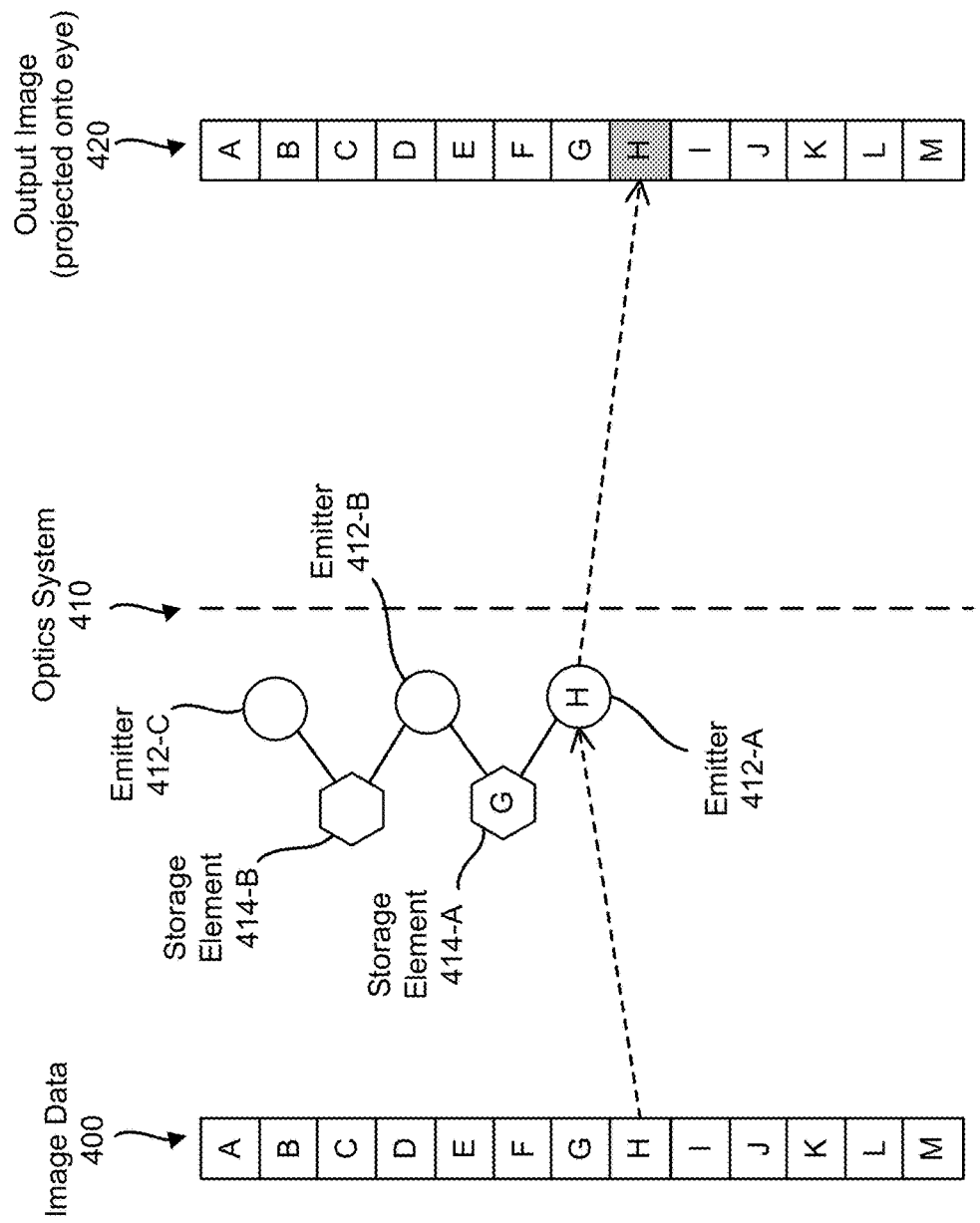

CONTROL SCHEME FOR A SCANNING DISPLAY

CROSS REFERENCE TO RELATED APPLICATIONS

This application is a continuation of U.S. Non-provisional application Ser. No. 16/274,143, filed Feb. 12, 2019, titled "Control Scheme For A Scanning Display," which claims the benefit and priority under 35 U.S.C. 119(a)-(d) of Greece Patent Application No. 20190100026, entitled "Control Scheme For A Scanning Display," filed Jan. 11, 2019, the contents of which are incorporated by reference herein in their entirety for all purposes.

BACKGROUND

Most displays, such as computer monitors, smartphone screens, and television screens, are viewed directly. Displays are sometimes incorporated into a head mounted device that includes optical elements which operate on image light produced by the display to form an output image for viewing by a user. There is usually a one-to-one correspondence between the pixels of a display image and the pixels of the output image seen by the user. In contrast, a scanning display forms an output image by combining multiple display images using a scanning mirror, e.g., to form a larger composite image using multiple, smaller display images. Scanning displays are useful in applications where, due to space constraints, a full sized display would be impractical. Because the scanning mirror needs to be synchronized with the outputting of the display images, the timing of the scanning should be taken into consideration as well as the timing with which image data is supplied to the display. The timing requirements for operating the scanning mirror are not always consistent with the timing requirements for operating the display.

BRIEF DESCRIPTION OF THE DRAWINGS

Illustrative embodiments are described with reference to the following figures.

FIGS. 4A to 4E show shifting of image data from a scanning display onto a user's eye, for controlling a scanning display in at least some embodiments.

Figure 1:
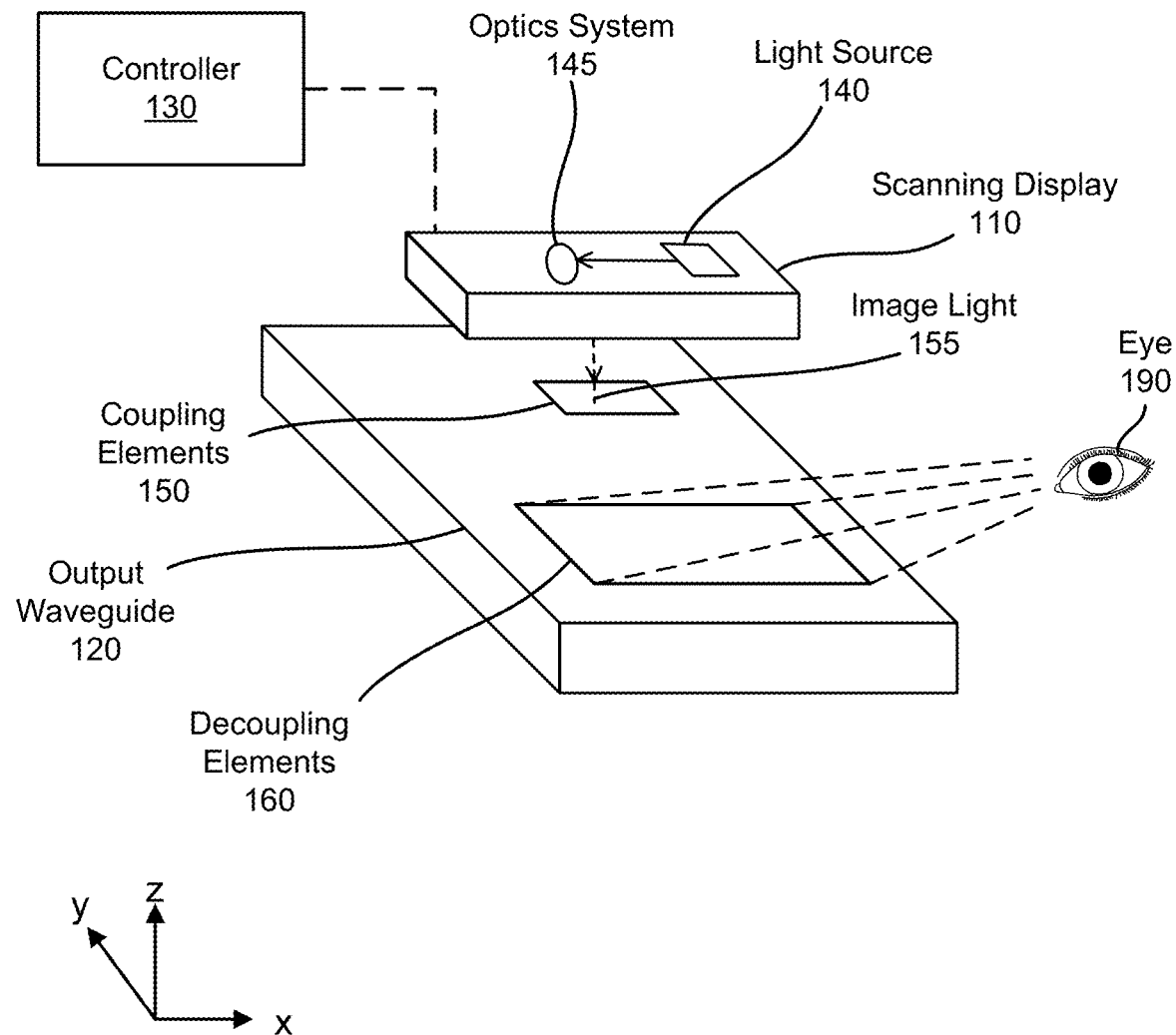
FIG. 1 shows a waveguide assembly for implementing one or more embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The terms "row" and "column" are used herein to refer to a physical arrangement of emitters and/or emitter related circuitry into groups, and are sometimes used together to differentiate between two spatial dimensions that are orthogonal to each other. Rows and columns are generally interchangeable and should not be taken to refer to any particular dimension. For instance, a row can refer to either the horizontal or the vertical dimension of a display device.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Example embodiments relate to techniques for controlling a display system that includes a scanning display. In particular, example embodiments are directed to controlling a scanning assembly in synchronization with output of images on a display. Embodiments are described in connection with a scanning assembly in which the scanning element is a scanning mirror driven using one or more microelectromechanical systems (MEMS) components. For example, the scanning mirror can be rotated in one or more dimensions using one or more MEMS actuators. However, the techniques described herein can be applied for controlling other types of scanning elements. In general, any reflective surface capable of scanning across a display can be controlled in accordance with the techniques herein.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 shows a waveguide assembly 100 for implementing one or more embodiments. In some embodiments, the waveguide assembly 100 is a component of a near-eye display (NED), for example, an HMD. The waveguide assembly 100 includes a scanning display 110, an output waveguide 120, and a controller 130. For purposes of illustration, FIG. 1 shows the waveguide assembly 100 associated with a single eye 190, but in some embodiments, another waveguide assembly separate (or partially separate) from the waveguide assembly 100, provides image light to another eye of the user. In a partially separate system, one or more components may be shared between waveguide assemblies for each eye.

The scanning display 110 generates image light 155. The scanning display 110 includes a light source 140 and an optics system 145. The light source 140 is an optical component that generates light using a plurality of emitters placed in an array.

Figure 2:
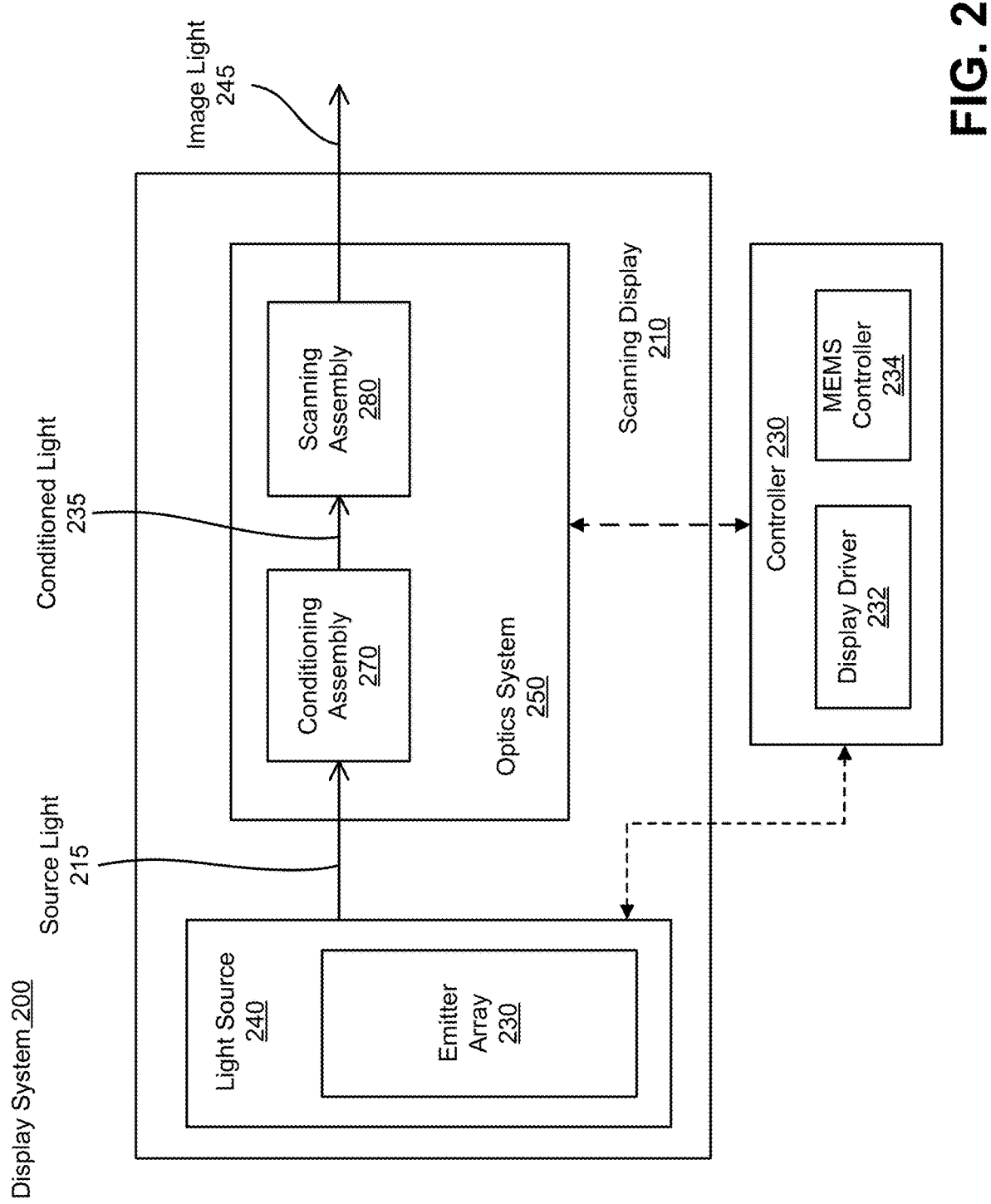
FIG. 2 is a simplified block diagram of a display system for implementing one or more embodiments.
Figure 3:
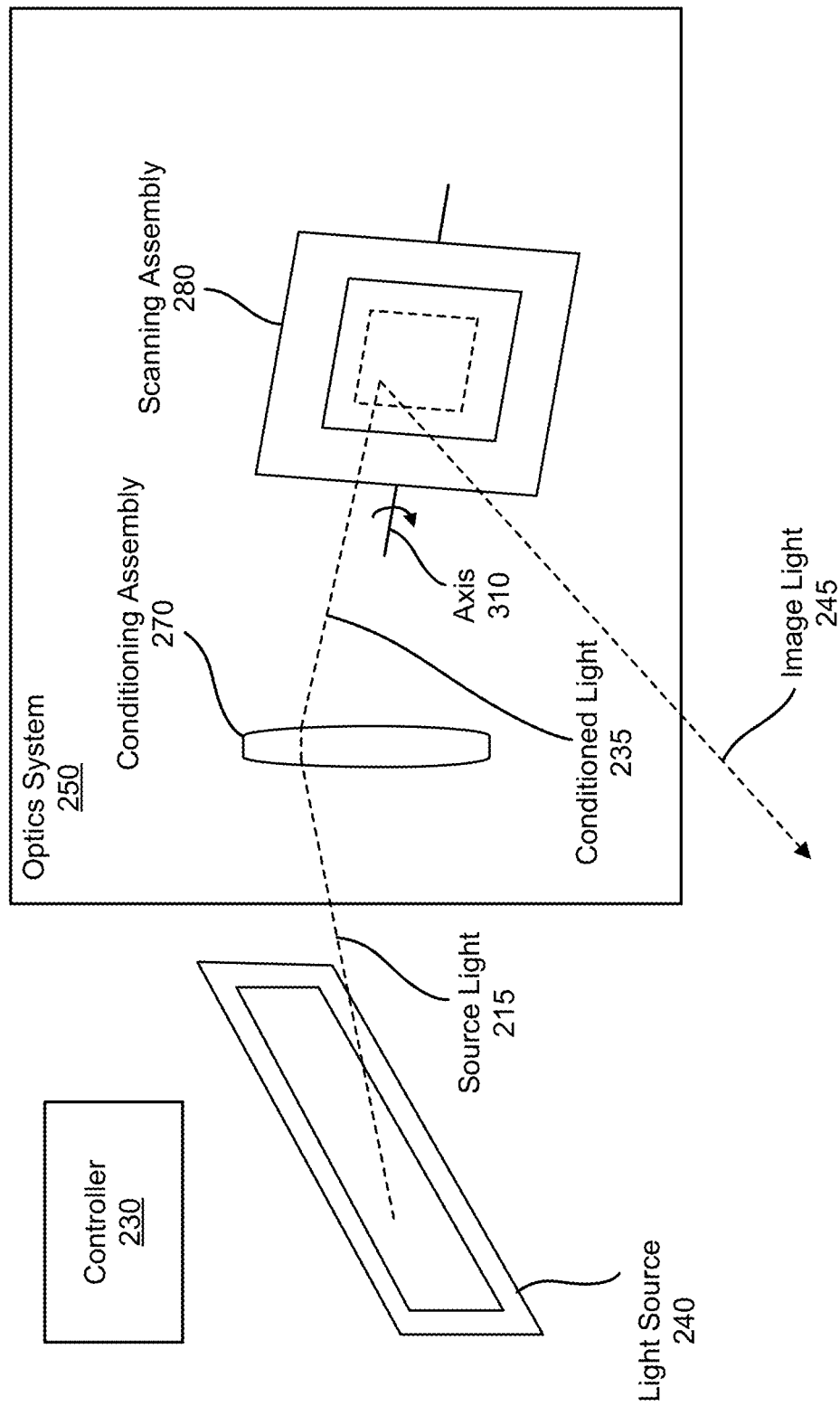
FIG. 3 shows the operation of the scanning display of FIG. 2.

The optics system 145 performs a set of optical processes, including, but not restricted to, focusing, combining, collimating, transforming, conditioning, and scanning processes on the image light generated by the light source 140. The optics system 145 may include a conditioning assembly and a scanning mirror assembly, which are shown in FIGS. 2 and 3. The scanning display 110 generates and outputs image light 155—influenced by at least one of the light source 140, the conditioning assembly, and the scanning mirror assembly—to one or more coupling elements 150 of the output waveguide 120.

The output waveguide 120 is an optical waveguide that outputs images to the eye 190 of the user. The output waveguide 120 receives the image light 155 at one or more coupling elements 150, and guides the received input image light 155 to one or more decoupling elements 160. In some embodiments, the one or more coupling elements 150 couple the image light 155 from the scanning display 110 into the output waveguide 120. The one or more coupling elements 150 may include, e.g., a diffraction grating, a holographic grating, some other element that couples the image light 155 into the output waveguide 120, or some combination thereof. For example, in embodiments where the coupling elements 150 include a diffraction grating, the pitch of the diffraction grating is chosen such that total internal reflection occurs, and the image light 155 propagates internally toward the one or more decoupling elements 160.

The one or more decoupling elements 160 decouple the total internally reflected image light from the output waveguide 120. The one or more decoupling elements 160 may include, e.g., a diffraction grating, a holographic grating, some other element that decouples image light out of the output waveguide 120, or some combination thereof. For example, in embodiments where the one or more decoupling elements 160 include a diffraction grating, the pitch of the diffraction grating is chosen to cause incident image light to exit the output waveguide 120. An orientation and position of the light exiting from the output waveguide 120 is controlled by changing an orientation and position of the image light 155 entering the one or more coupling elements 150.

The output waveguide 120 may be composed of one or more materials that facilitate total internal reflection of the image light 155. The output waveguide 120 may be composed of e.g., silicon, plastic, glass, or polymers, or some combination thereof. The output waveguide 120 has a relatively small form factor. For example, the output waveguide 120 may be approximately 50 mm wide along an x-dimension, 30 mm long along a y-dimension and 0.5 to 1 mm thick along a z-dimension.

The controller 130 controls the scanning operations of the scanning display 110. The controller 130 determines scanning instructions for the scanning display 110 based at least on the one or more display instructions. Display instructions are instructions to render one or more images. In some embodiments, display instructions may simply be an image file (e.g., bitmap). The display instructions may be received from, e.g., a console of a NED system (not shown). Scanning instructions are instructions used by the scanning display 110 to generate image light 155. The scanning instructions may include, e.g., a type of a source of image light (e.g., monochromatic or polychromatic), a scanning rate, an orientation of a scanning apparatus, one or more illumination parameters (described below with reference to FIG. 2), or some combination thereof. The controller 130 includes a combination of hardware, software, and/or firmware not shown here so as not to obscure other aspects of the disclosure.

FIG. 2 is a simplified block diagram of a display system 200 for implementing one or more embodiments. The display system 200 includes a scanning display 210, which is an embodiment of the scanning display 110 of FIG. 1, and further includes a controller 230, a light source 240, and an optics system 250. The light source 240 is an embodiment of the light source 140; the optics system 250 is an embodiment of the optics system 145; and the controller 230 is an embodiment of the controller 130.

The scanning display 210 generates image light 245 in accordance with scanning instructions from the controller 230. The scanning display 210 includes a light source 240 and an optics system 250. The light source 240 is a source of light that generates a spatially coherent or a partially spatially coherent source light 215. The source light 215 may comprise a display image. The optics system 250 comprises at least a conditioning assembly 270 and a scanning assembly 280. The conditioning assembly 270 conditions the source light 215 into conditioned light 235, and the scanning assembly 280 scans the conditioned light 235. The image light 245 may be coupled to an entrance of an output waveguide (e.g., one or more coupling elements 150 of the output waveguide 120 of FIG. 1).

The light source 240 emits light in accordance with image data in the form of one or more illumination parameters received from the controller 230. An illumination parameter is used by the light source 240 to generate light. An illumination parameter may include, e.g., source wavelength, pulse rate, pulse amplitude, beam type (continuous or pulsed), other parameter(s) that affect the emitted light, or some combination thereof. The illumination parameter can be applied to an emitter of the light source 240 using analog and/or digital signals. The illumination parameter and/or other image data can be supplied from the controller 230 to circuitry that generates, based on the image data, the signals which drive the light source. This driving circuitry can be included in the light source 240 (e.g., co-located with emitters of the light source) or located external to the light source 240.

The light source 240 comprises a plurality of emitters, wherein each emitter may be, e.g., a light-emitting diode (LED), a laser diode, a vertical cavity surface emitting laser (VCSEL), an organic LED (OLED), a micro-LED (uLED), a tunable laser, or some other light source that emits coherent or partially coherent light. The emitters of the light source 240 emit light in a visible band (e.g., from about 390 nm to 700 nm), and they may emit light in accordance with one or more illumination parameters. In some embodiments, the scanning display 210 comprises multiple light sources each with its own array of emitters emitting light in a distinct wavelength such that when scanned, light emitted from each of the light sources are overlapped to produce various wavelengths in a spectrum. Each emitter of the light source 240 comprises an emission surface from which a portion of source light is emitted. The emission surface may be identical for all emitters or may vary between emitters. An emitter width is a width of an area of the emission surface. The emission surface may have different shapes (e.g., circular, hexagonal, etc.). For example, an emitter which is a uLED with a circular emission surface may have an emitter width of 25 micrometers characterized as a diameter of the circular emission surface.

The plurality of emitters of the light source 240 is arranged as an array of emitters. The emitters can be organized in a one-dimensional (1D) or two-dimensional (2D) array. In a 2D array, the emitters are formed along a first dimension and a second dimension orthogonal to the first dimension (e.g., along rows and columns). Each column of emitters corresponds to a respective column in an image ultimately displayed to the user. The emitters may be of various colors. For example, the light source 240 may include a set of red emitters, a set of green emitters, and a set of blue emitters, where emitters of different color together form an individual pixel. An individual pixel may include at least one red emitter, at least one green emitter, and at least one blue emitter. Rows of emitters of the same color may be arranged in a single group. For example, the array may comprise N rows of red emitters followed by N rows of green emitters and then N rows of blue emitters.

The light source 240 may include additional components (e.g., driving circuits, memory elements, heat sinks, etc.). In one or more embodiments, the light source 240 comprises a plurality of data shifting circuits and a plurality of driving circuits, which are electrically coupled to the array of emitters. The data shifting circuits may supply image data from the controller 230 to the driving circuits, which then generate signals that activate the emitters. In particular, as explained in connection with FIGS. 4A to 4E, image data can be sequentially shifted through a row or column of emitters to form a display image, with the resulting emitted light being scanned to form an output image. The driving circuits include circuitry for controlling the array of emitters based on the image data. For example, the driving circuits may apply illumination parameters received from the controller 230 (e.g., brightness values received from a display driver of the controller) to control each emitter in the array of emitters using analog and/or digital control signals. The emitters can be controlled using currents (i.e., the display can be a current mode display) or voltages. In some embodiments, the emitters are controlled using pulse-width modulation (PWM), amplitude adjustments, or a combination of both.

The conditioning assembly 270 conditions source light 215 from the light source 240. Conditioning the source light 215 may include, e.g., expanding, collimating, focusing, distorting emitter spacing, adjusting orientation an apparent location of an emitter, correcting for one or more optical errors (e.g., field curvature, chromatic aberration), some other adjustment of the light, or some combination thereof. The conditioning assembly 270 comprises one or more optical elements (e.g., lenses, mirrors, apertures, gratings, or any other suitable optical element that affects image light).

The scanning assembly 280 includes one or more optical elements that redirect light via one or more reflective portions of the scanning assembly 280. The reflective portions may comprise a scanning mirror or other reflective surface. The direction where the light is redirected toward depends on specific orientations of the one or more reflective portions. The one or more reflective portions of the scanning assembly may form a planar or curved surface (e.g., spherical, parabolic, concave, convex, cylindrical, etc.) that operates as a mirror. The scanning assembly 280 scans along at least one dimension of a 2D emitter array. In some embodiments, the scanning assembly 280 is configured to scan in at least the smaller of the two dimensions. For example, if the emitters are arranged in a 2D array where the rows are substantially longer (i.e., contain more emitters) than the columns, then the scanning assembly 280 may scan down the columns (e.g., row by row or multiple rows at a time). In other embodiments, the scanning assembly 280 may perform a raster scan (horizontally or vertically depending on scanning direction). The scanning assembly 280 can include multiple scanning mirrors, each of which is configured to scan in 0, 1, or 2 dimensions. The scanning can be controlled using one or more MEMS devices, e.g., electrostatic or electromagnetic actuators, included in the optics system 250.

The controller 230 controls the light source 240 and the optics system 250. The controller 230 takes content for display and divides the content into discrete sections. The controller 230 instructs the light source 240 to sequentially present the discrete sections using individual emitters corresponding to a respective row or column in an image ultimately displayed to the user. The controller 230 instructs one or both of the conditioning assembly 270 and the scanning assembly 280 to condition and/or scan the presented discrete sections. The controller 230 controls the optics system 250 to direct the discrete sections of the image light 245 to different areas, e.g., different portions of one or more coupling elements 150 of the output waveguide 120. Accordingly, at the eye box of the output waveguide, each discrete portion is presented in a different location. While each discrete section is presented at different times, the presentation and scanning of the discrete sections occurs fast enough such that a user's eye integrates the different sections into a single image or series of images. The controller 230 also provides illumination parameters (e.g., intensity or brightness values) for the light source 240. The controller 230 may control each individual emitter of the light source 240.

The controller 230 may include a combination of software and/or hardware components that control the scanning assembly 280 in synchronization with controlling the light source 240. For example, the controller 230 may include one or more computer processors, a dedicated graphics processor, application-specific integrated circuits, software programs containing instructions for execution by the one or more computer processors, etc. In some embodiments, the controller 230 includes a display driver 232 and a separate MEMS controller 234. The display driver 232 can be implemented as an integrated circuit that generates the image data for the light source 240 based on instructions from a computer processor executing a software application that determines the display images. For example, the software application can be an application that generates an AR or VR presentation for viewing on an HMD. The MEMS controller 234 may include circuitry that generates control signals for one or more MEMS devices that drive the scanning assembly 280. The control signals can include periodic waveforms with linear or sinusoidal pulses. The display driver 232 and the MEMS controller 234 may be communicatively coupled to one another to facilitate the synchronization of output from the display driver 232 with output from the MEMS controller 234. In some embodiments, the controller 230 includes timing circuitry such as clock generator that produces one or more clock signals which determine the timing of the outputs of the display driver 232 and the MEMS controller 234. The clock signals may, for example, determine various operational phases for the output of instructions to the light source 240 and/or the output of instructions to the MEMS devices.

FIG. 3 shows the operation of the scanning display 210 of FIG. 2. The scanning display 210 generates light in accordance with scanning instructions from the controller 230. The light source 240 of the scanning display 210 generates the spatially coherent or the partially spatially coherent source light 215. The optics system 250 receives the source light 215 and with the conditioning assembly 270 converts the source light 215 into conditioned light 235. The conditioned light 235 is then scanned by the scanning mirror assembly 280. The scanning assembly 280 may perform the scanning by rotating about one or more axes (e.g., an axis 310), thereby emitting the image light 245 in one or more dimensions.

FIGS. 4A to 4E illustrate shifting of image data 400 from a scanning display onto a user's eye. The process shown in FIGS. 4A to 4E can be used to control a scanning display in accordance with the techniques described herein. The image data 400 is depicted using alphabetical labels "A" to "M", with each letter representing a row of image data. Each piece of image data 400 is transmitted over time to N number of emitters 412. The emitters 412 may belong to different rows of the same column. Alternatively, the emitters 412 may belong to different columns of the same row. The shifting process depicted in FIGS. 4A to 4E can be used to simultaneously drive multiple rows/columns at a time. For example, in one embodiment the scanning display has 2,560×1536 emitters with 3 colors (e.g., red, green, and blue) and N=8 rows per color. One way to operate the emitters is to send image data for all N emitters every time the row/column is activated. For example, the image data A, C, and E could be sent to emitters 412-C, 412-B, and 412-A, respectively, followed by image data B, D, and F during the next row time. The process of FIGS. 4A to 4E shows an alternative method that reduces the amount of data that needs to be sent.

Figure 4A:
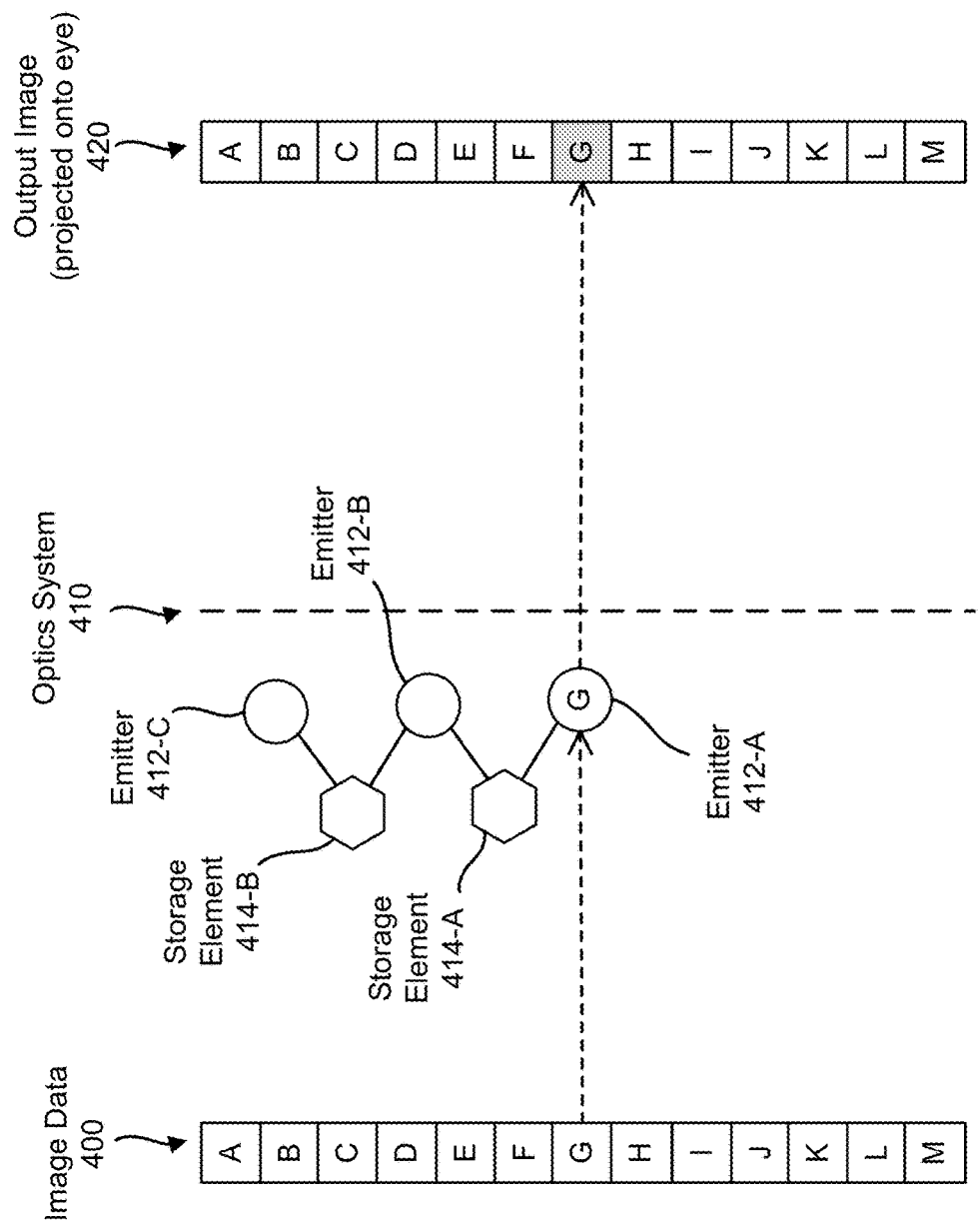

FIG. 4A shows image data G being loaded into the emitter 412-A and scanned by an optics system 410 to emit light onto an output image 420. The output image 420 corresponds to an image projected onto an eye of a user. As shown, the value G is represented in the output image 420 at a spatial location corresponding to the location of the value G in the image data 400. For convenience, these locations will be referred to as pixels even though, as explained earlier, a pixel may include multiple emitters of different colors rather than a single emitter. Each pixel in the output image 420 may be illuminated N times for each color over a scan cycle. For example, the image data G may be output N times, each time using a different one of the emitters 412. To avoid retransmitting the image data each time, the image data can be stored using storage elements 414 and shifted into the next emitter that is to receive the same image data.

FIG. 4B shows the image data G transferred to storage element 414-A and loading of new image data H into the emitter 412-A. The image data H is projected onto a corresponding pixel in the output image 420.

Figure 4C:
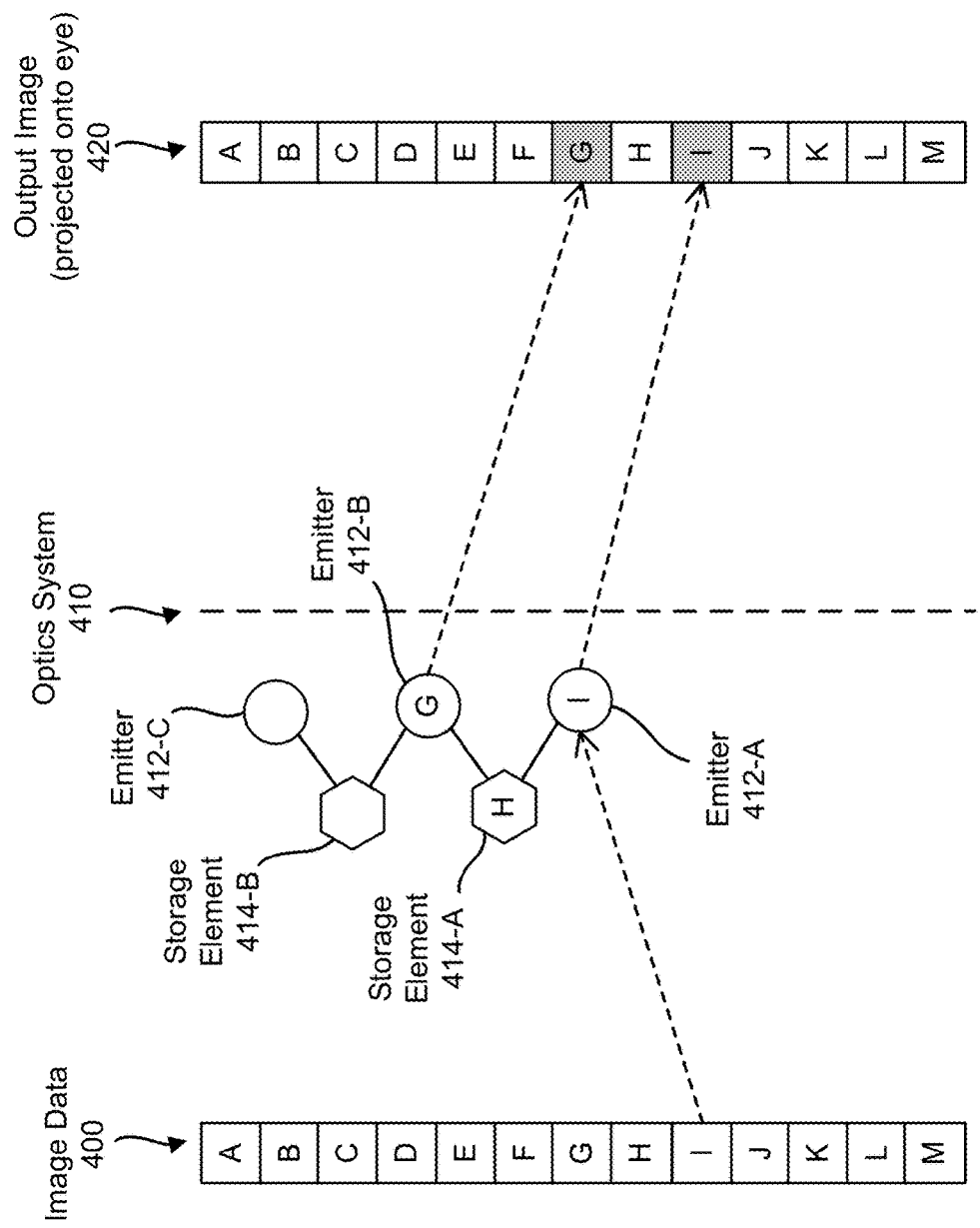

FIG. 4C shows the image data G loaded into emitter 412-B from the storage element 414-A. The image data H is loaded into the storage element 414-A in preparation for loading into the emitter 412-B during the next row time. Additionally, new image data I is loaded into emitter 412-A, with the image data G and I being projected onto the output image 420.

Figure 4D:
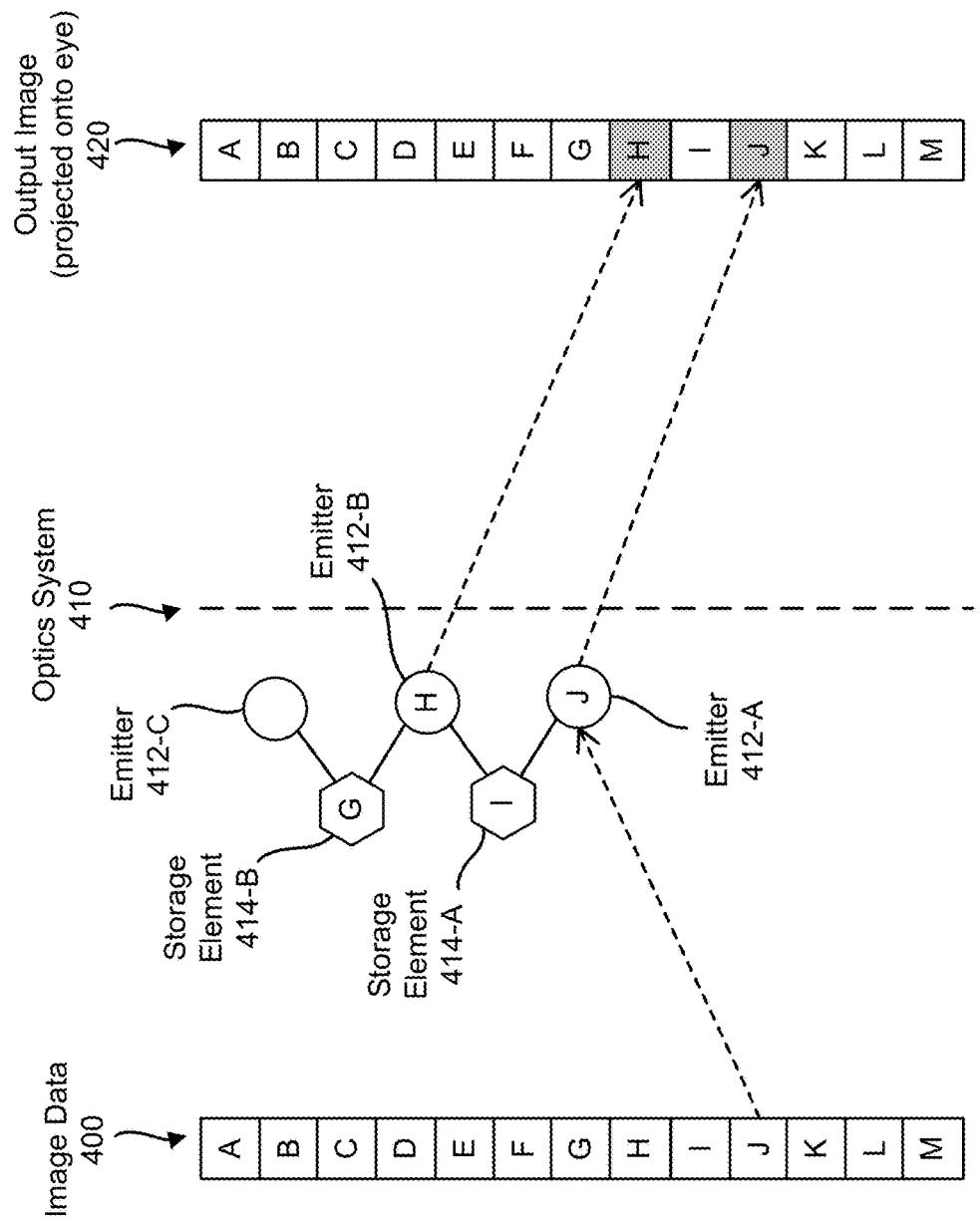

FIG. 4D shows the image data H loaded into emitter 412-B from the storage element 414-A. The image data I is loaded into the storage element 414-A in preparation for loading into the emitter 412-B during the next row time. Similarly, the image data G is loaded into the storage element 414-B in preparation for loading into the emitter 412-C during the next row time. Additionally, new image data J is loaded into emitter 412-A, with the image data H and J being projected onto the output image 420.

Figure 4E:
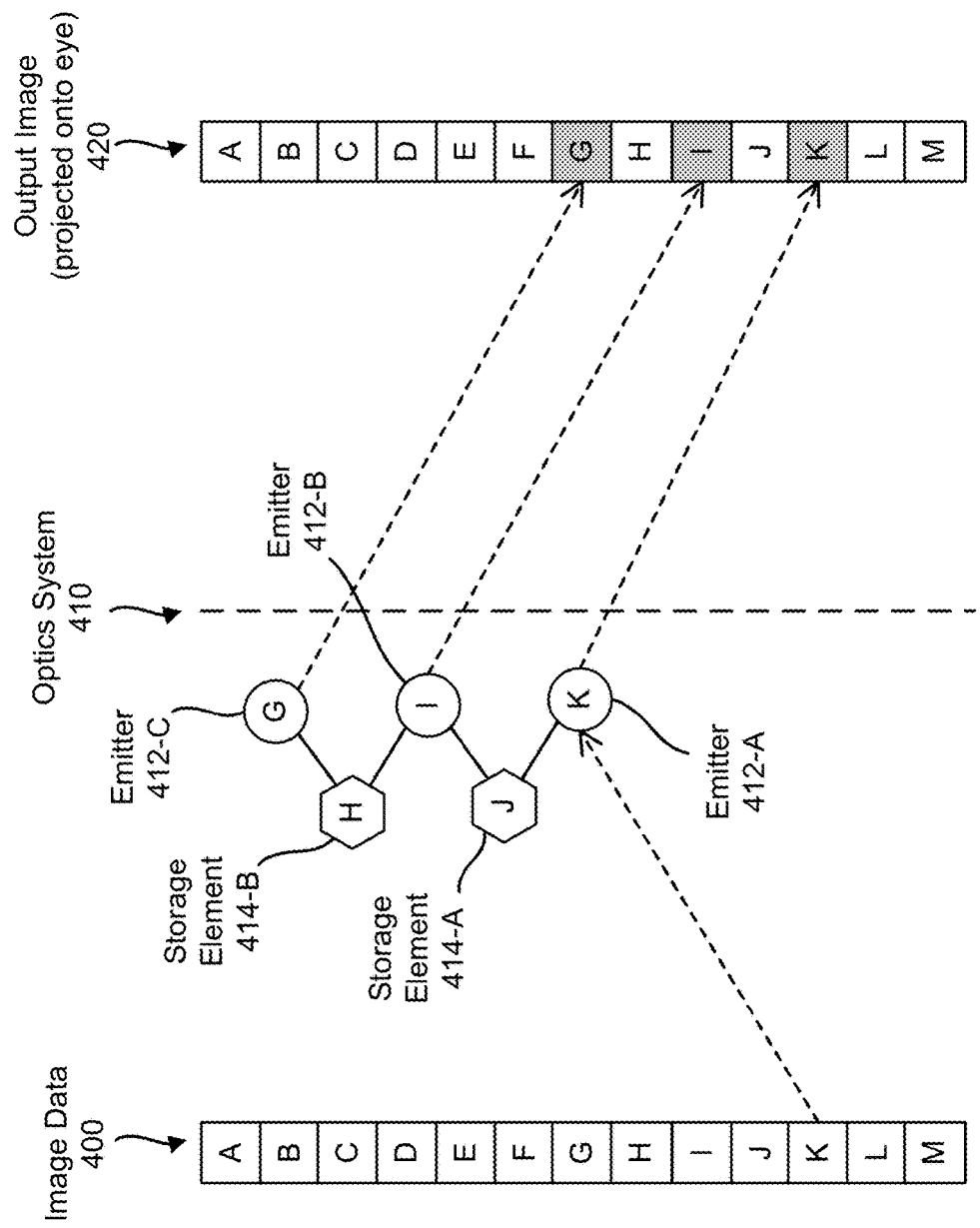

FIG. 4E shows the image data G loaded into emitter 412-C from the storage element 414-B and the image data I loaded into emitter 412-B from the storage element 414-A. The image data H and the image data J are loaded into the storage elements 414-B and 412-A, respectively. Additionally, new image data K is loaded into emitter 412-A, with the image data G, I, and K being projected onto the output image 420. Thus, FIGS. 4A to 4E illustrate the sequential loading of new image data into a first emitter (i.e., emitter 412-A), with the image data being shifted into other emitters (i.e., emitters 412-B and 412-C) using the storage elements 414, until the end of the row or column is reached. It can be seen that if the process were to continue, each item of image data would be projected onto the output image 420 a total of N times, once for each emitter 412, each time corresponding to a different rotational position of a scanning assembly. Each pixel of the output image 420 would then be perceived as an aggregate of N number of brightness units.

Example waveforms for controlling a scanning assembly through a MEMS device will now be described. The waveforms can be applied to activate a MEMS device to trigger a rotational movement of a scanning assembly in synchronization with control of a display. In particular, the display can be controlled so that the emitters emit light during specific periods of time relative to the rotational movement of the scanning assembly. The example waveforms are described as having portions (e.g., rising or falling portions of individual pulses) or segments (e.g., a segment within a particular rising or falling portion) that correspond to emission times or emission periods. For discussion purposes, it is assumed that the waveforms can be applied to effect instantaneous movement of the scanning assembly, such that the timing of the rotational movements exactly matches that of the waveforms. Thus, the waveforms are used to describe the rotational movements. However, it is understood that in practice, there may be a slight delay from when a waveform is applied to when the scanning assembly begins to rotate. There may also be delays when reversing a direction of rotation. Such delays can be caused, for example, by inertia of the MEMS device and/or inertia of the reflective surface.

Figure 5:
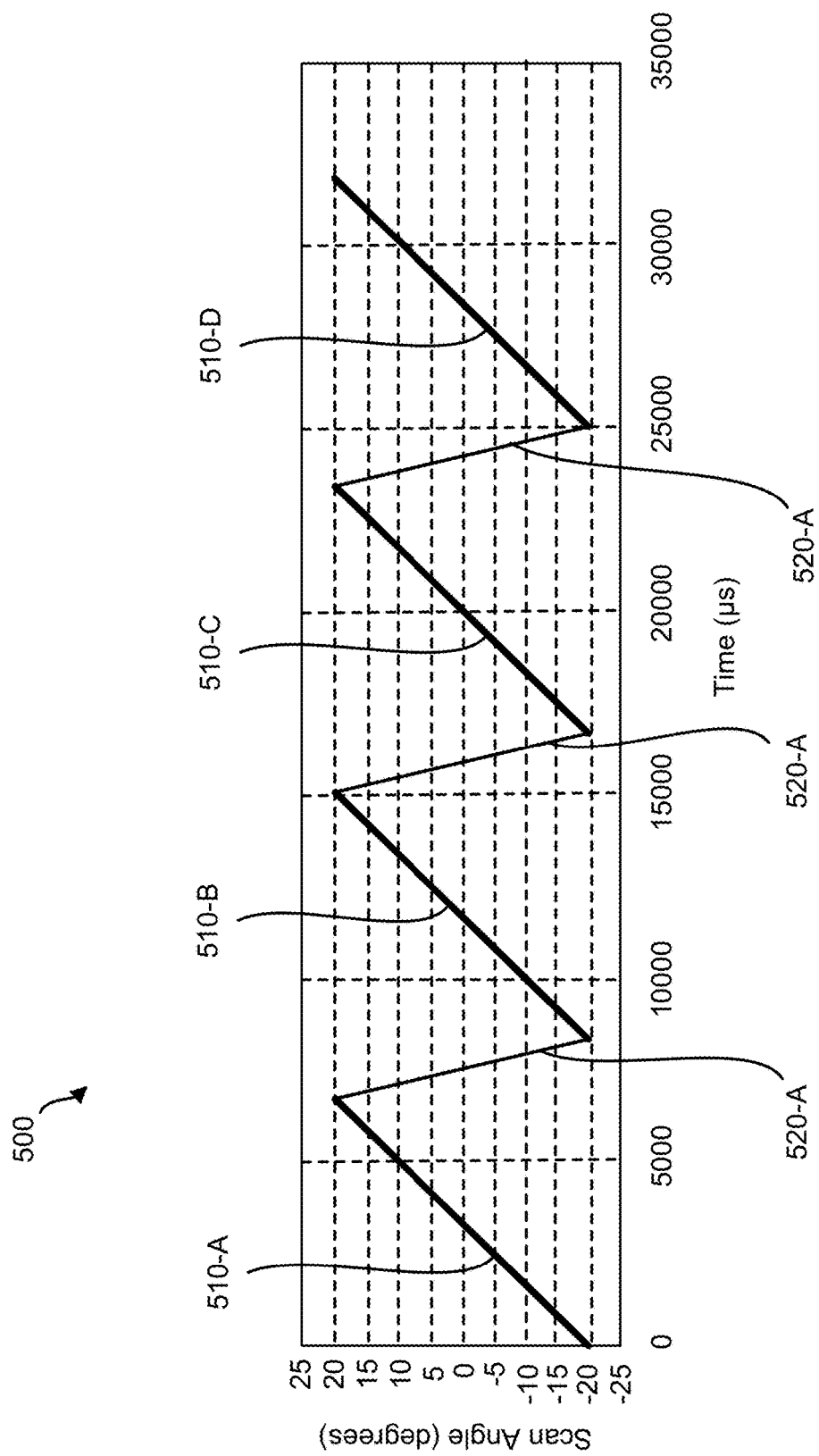
FIGS. 5 to 8 show example waveforms usable for controlling a scanning assembly, in accordance with some embodiments.

FIG. 5 is a graph of a waveform 500 that can be used to drive a MEMS device for controlling a scanning assembly, in accordance with an embodiment. The waveform 500 is a linear waveform comprising a set of pulses that repeat periodically (at a particular frequency). The waveform 500 is shown with a frequency of 120 Hertz (Hz). The waveform 500 represents a clock signal that can be output from the controller 230 to control a MEMS device of the optics system 250. Each pulse includes a rising portion 510 that ramps up linearly as a function of time, followed by a corresponding falling portion 520 that is also linear. When emitting on a rising portion, the rising portion is generally larger in duration than the falling portion. The optics system 250 may include circuitry configured to drive the MEMS device so that the scanning assembly rotates across a range of scan angles. In the example of FIG. 5, the scan angles range from −20 to +20 degrees. The zero degree position may correspond to a position at which the optical axis of the reflective surface of the scanning assembly is orthogonal to the center of the display. For example, if the display and the scanning assembly both include flat, 2D surfaces, then the zero position can be a position at which both surfaces are parallel to each other. As shown, each pulse includes a zero crossing on the rising portion as a well as a zero crossing on the falling portion. Because the rising portions 510 are linear, the speed at which the scanning assembly rotates across the range of scan angles is constant. Similarly, the speed at which the scanning assembly rotates during the falling portions 520 is also constant.

As mentioned earlier, the scanning assembly is driven in synchronization with the display. For example, the display can be controlled such that light is emitted on only the rising portions 510, with the falling portions corresponding to periods of non-emission. In that case, the rate at which image data is supplied to the display (i.e., the frame rate) would be 120 Hz (corresponding to a frame period of 8.3 milliseconds) with a duty cycle of 80%. The amount of time spent supplying data for a particular row of emitters is referred to herein as the row time. In general, the row time is equal to the emission time divided by the number of rows.

Figure 6:
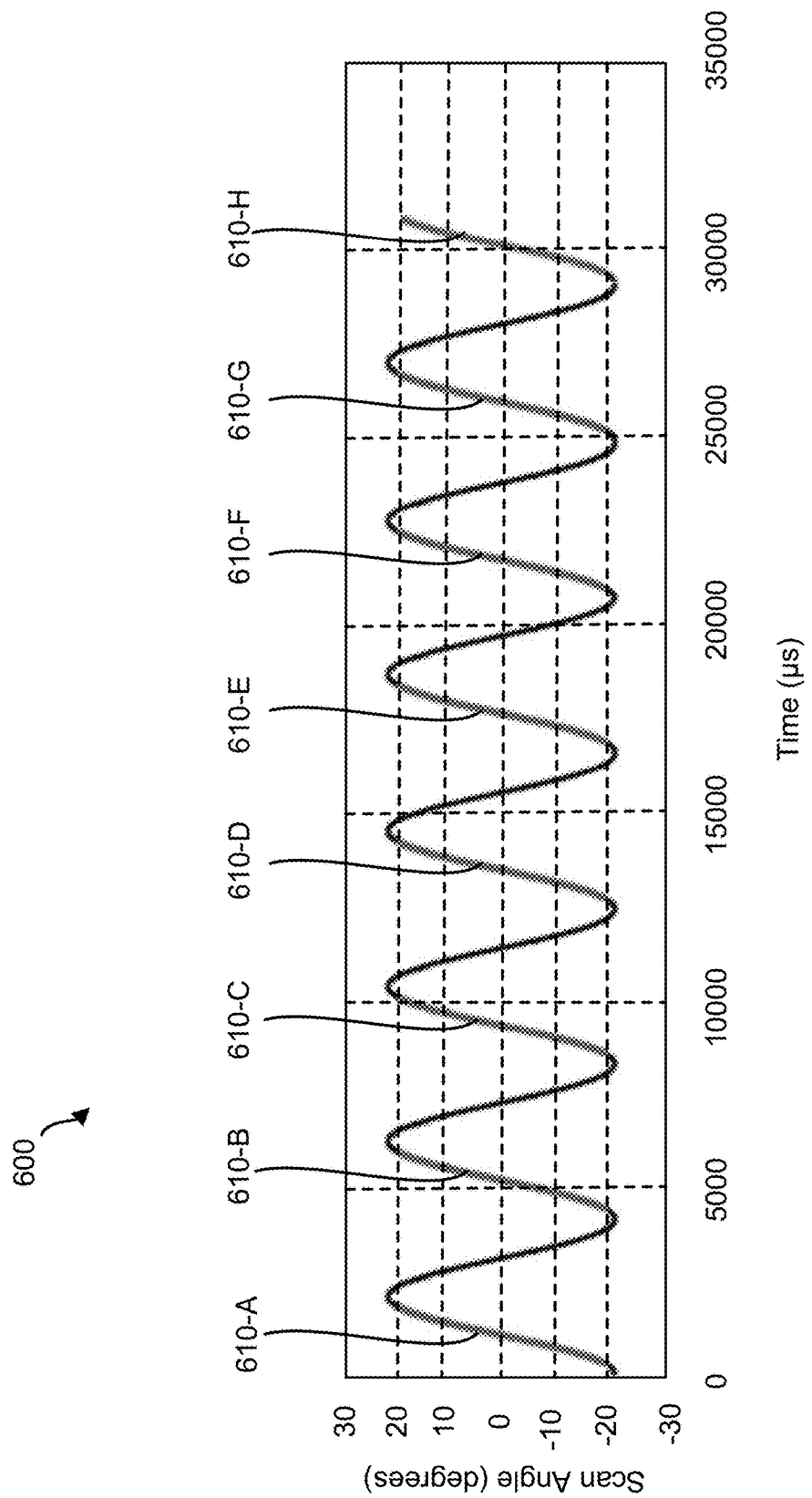

FIG. 6 is a graph of a waveform 600 that can be used to drive a MEMS device for controlling a scanning assembly, in accordance with an embodiment. Unlike the waveform 500, the waveform 600 is non-linear. In particular, the waveform 600 is a sinusoidal waveform that can be used to drive a MEMS device according to a resonant mode of operation (e.g., causing an electrostatic actuator to oscillate at a particular frequency). Resonant MEMS devices provide certain benefits over linear MEMS devices, including lower power consumption, reduced size, and potentially larger scan angles. However, as will be explained, controlling a resonant MEMS device in synchronization with a display can be challenging.

The waveform 600 is shown with a frequency of 240 Hz, with the range of scan angles being approximately the same as in FIG. 5. If the display is controlled to emit on every rising portion 610 of the waveform 600 (i.e., so that emission times correspond to rising portions and non-emission times correspond to falling portions), then the frame rate would be 240 Hz. Because the rising portions 610 are non-linear, the rotational speed of the scanning assembly is not constant. At the zero crossing of the rising portions 610, the speed is higher compared to the beginning or end of the rising portion. The speed difference depends on the starting point of the rising portion and the end point of the rising portion. For example, if the top and bottom 10% of each pulse is clipped (as discussed below), then the speed at the zero crossing of the rising portions 610 could be 2.3 times higher compared to the speed at the starting point (i.e., the beginning of the non-clipped part of the rising portions 610) or the speed at the end of the non-clipped part of the rising portions 610. Therefore, the rate at which image data is supplied for each row of the display should also be non-constant. For example, each row of the display could be driven for a particular amount of time within a range between a minimum row time and a maximum row time, where the average row time is equal to the emission time divided by the number of rows. Emission durations can also be adjusted for each row in correspondence with changes in row time. In particular, the emission duration of a row can be decreased for shorter row times and increased for longer row times. If the row times and emission durations were constant, this could lead to incorrect mapping of display images onto the output image. For example, since faster speeds result in more display area being covered in any given amount of time, failure to adjust the timing of the display images could lead to non-uniform pixel sizing of the output image, i.e., non-uniform resolution. Therefore, the timing of the image data should be dynamically adjusted so that less time is spent supplying image data at faster movement speeds and more time is spent at slower speeds. The frame rate and the MEMS frequency are therefore interrelated.

One option for reducing the complexity of the circuitry for driving the display when a resonant MEMS based scanning assembly is used would be to confine the emission times to the most linear segment of the rising portion 610. The most linear segment is at the center of the rising portion 610. In comparison with the center segment, the beginning and end segments of the rising portion 610 are much more non-linear. Accordingly, part of the beginning and end of each rising portion 610 could be ignored for emission purposes. For example, 10% of the top and bottom portions of every pulse can be clipped off and ignored when using the waveform 600 for determining the timing of emission. However, the exact amount of clipping can vary and the amount by which the top is clipped can be different than the amount by which the bottom is clipped.

Figure 7:
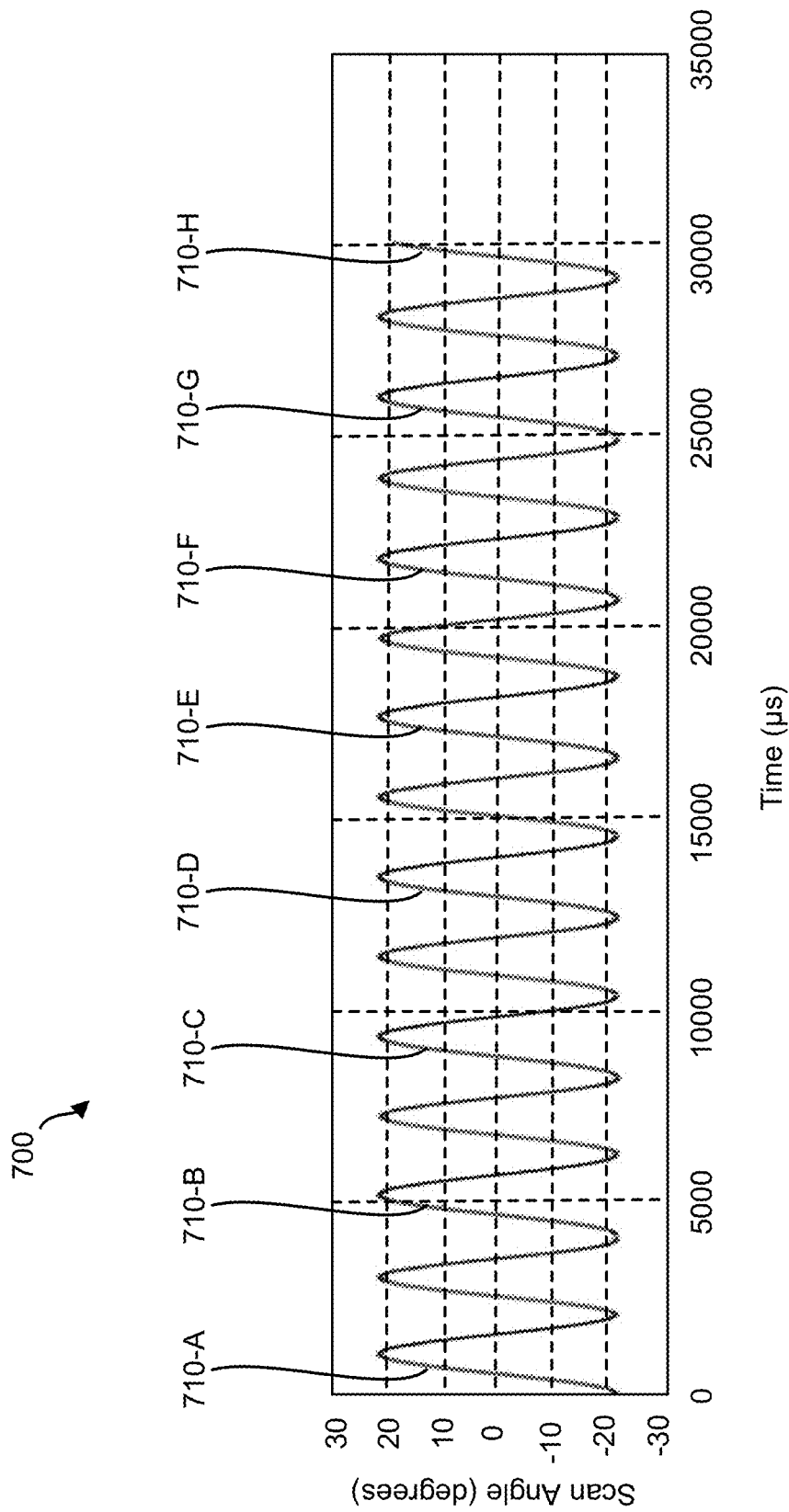

FIG. 7 is a graph of a waveform 700 that can be used to drive a MEMS device for controlling a scanning assembly, in accordance with an embodiment. The waveform 700 has a frequency of 480 Hz. However, unlike with the waveform 600, the emission periods correspond to every other rising portion 710, i.e., a frame rate of 240 Hz. The decision not to emit during every pulse can be based on timing constraints on the operation of the scanning assembly and/or timing constraints on the operation of the display. For example, the scanning assembly may be restricted to operation above a certain resonant frequency (e.g., 400 Hz or more) for mechanical stability reasons (hence the choice of 480 Hz for the resonant frequency). Thus, the design of the scanning assembly may dictate the range of frequencies with which the MEMS devices can be driven.

Additionally, the display system is bandwidth limited in that the amount of data that can be supplied in a given amount of time from the controller to the circuitry that drives the emitters is finite (hence the choice of a 240 Hz frame rate). A higher frame rate would require a correspondingly higher data bandwidth. Further, in this example, although the frame rate is the same as in FIG. 6 (240 Hz), there is less time to drive the emitters in any given frame because the durations of each pulse of the waveform 700 are shorter than those of the waveform 600. For example, when driving the display in conjunction with waveform 700, the average row time could be 0.48 microseconds and the emitter on-time per frame could be 0.74 milliseconds (in contrast to the respective times mentioned above for the waveform 600: 0.97 microseconds and 1.49 milliseconds). In practice, there may need to be a compromise between stable resonant operation and efficient data transfer. For example, after selecting a frame rate based on the design of the display system, a resonant frequency at which the scanning assembly can operate stably can be selected.

As with the waveform 500, because the waveform 600 is non-linear, the row times and emission durations for the display should be dynamically adjusted to account for variation in the speed of the scanning assembly. In addition or as an alternative to the clipping technique described earlier, other techniques for reducing the impact of speed variations can be applied. These additional techniques are described below.

Figure 8:
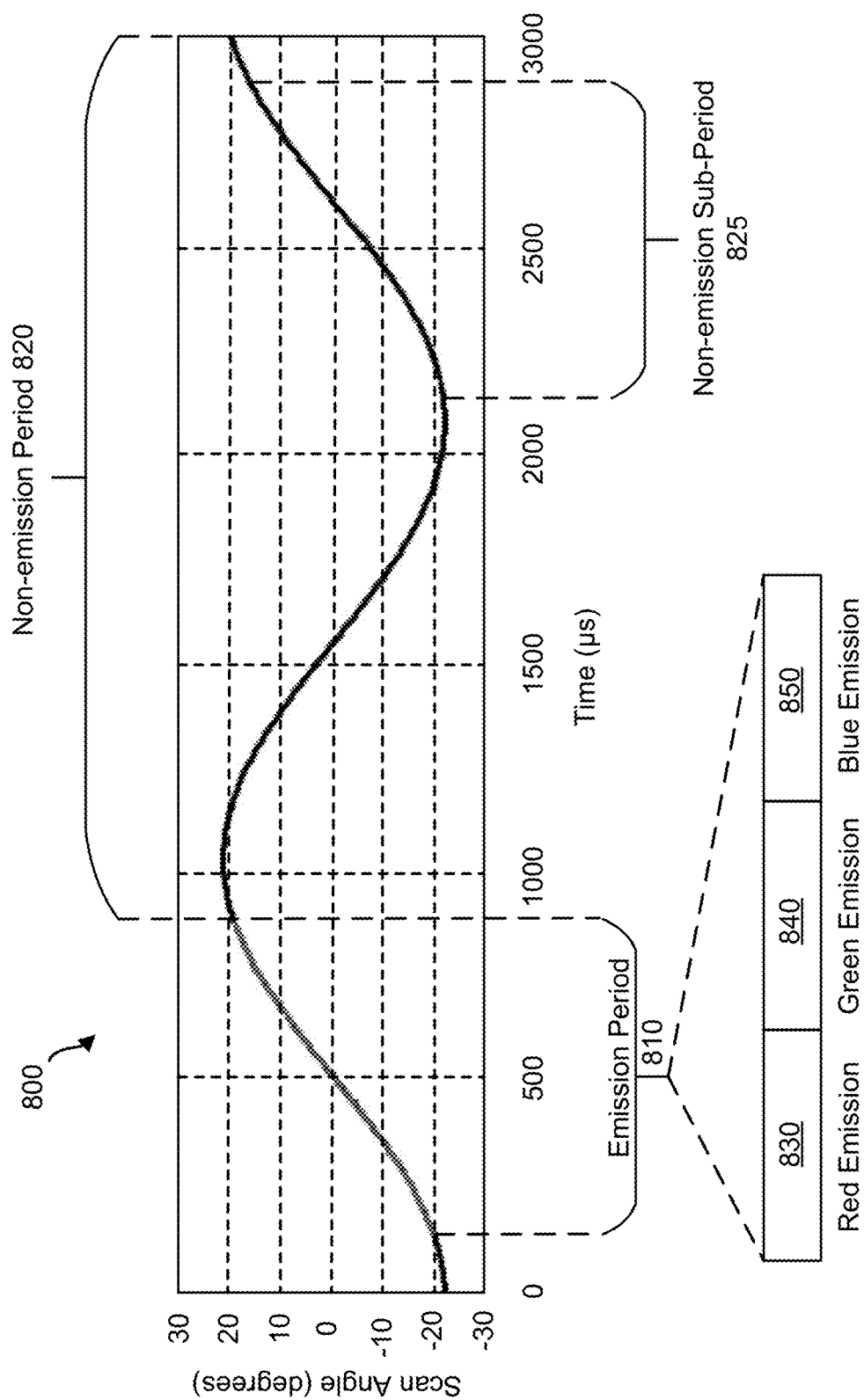

FIG. 8 shows a waveform 800 that can be used to drive a MEMS device for controlling a scanning assembly, in accordance with an embodiment. The waveform 800 has a frequency of 480 Hz. Similar to the example of FIG. 7, the emission times of the display are limited to every other rising portion. Thus, an emission period 810 corresponds to a first rising portion, followed by a non-emission period 820 including a sub-period 825 corresponding to the next rising portion. The emission period 810 can be allocated for driving different color emitters. For example, in a display comprising N rows of red emitters followed by N rows of green emitters and then N rows of blue emitters, the emission period 810 can be divided into a first period 830 in which the red emitters are activated, a second period 840 in which the green emitters are activated, and a third period 850 in which the blue emitters are activated. The periods 830, 840, and 850 may be equal in duration so that each color is driven for one-third of a full row time (e.g., an average per color row time of 160 nanoseconds, for an average row time of 480 nanoseconds).

Figure 9:
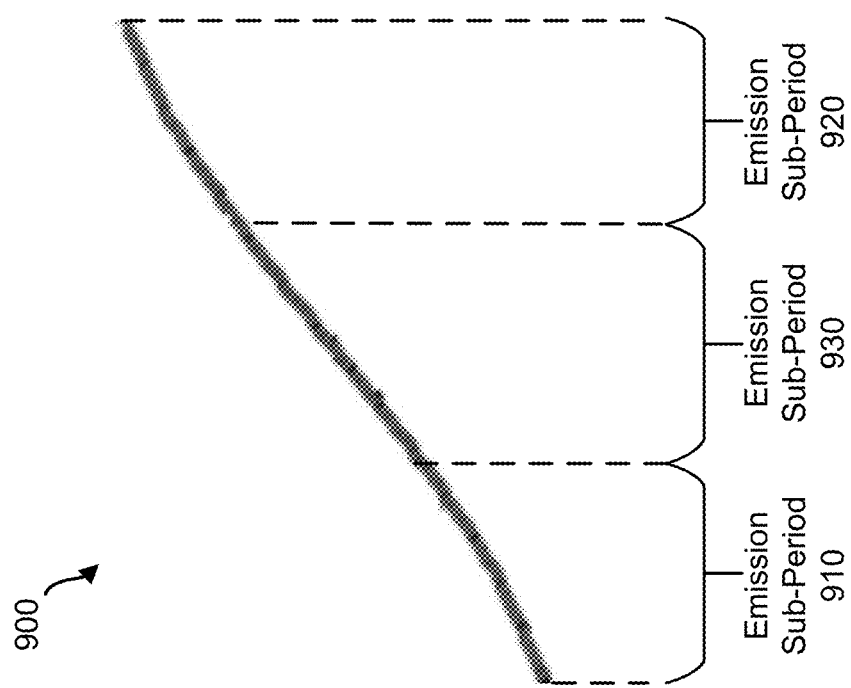
FIG. 9 shows a rising portion of a sinusoidal waveform for controlling a scanning assembly, in accordance with an embodiment.

FIG. 9 shows a rising portion 900 of a sinusoidal waveform. The rising portion 900 corresponds to an emission period that has been divided into three sub-periods 910, 920, and 930. As mentioned earlier, the center segment of the rising portion is the most linear segment and thus has the least amount of speed variation. This corresponds to the sub-period 930. The beginning and end segments are more non-linear and therefore have more speed variation. While the earlier described clipping technique can be applied to constrain the emission time as much as possible to the center segment, restricting emission to only the sub-period 930 would greatly reduce the amount of time that can be spent driving the display and, consequently, may require a higher data bandwidth than is supported by the display system. Therefore, the extent to which clipping can be applied is limited. One way to make use of the sub-periods 910 and 920 while mitigating the effects of speed variation is to move one or more sub-periods so that the sub-periods 910 to 930 do not all correspond to the same rising portion or pulse, as shown in FIG. 10.

Figure 10:
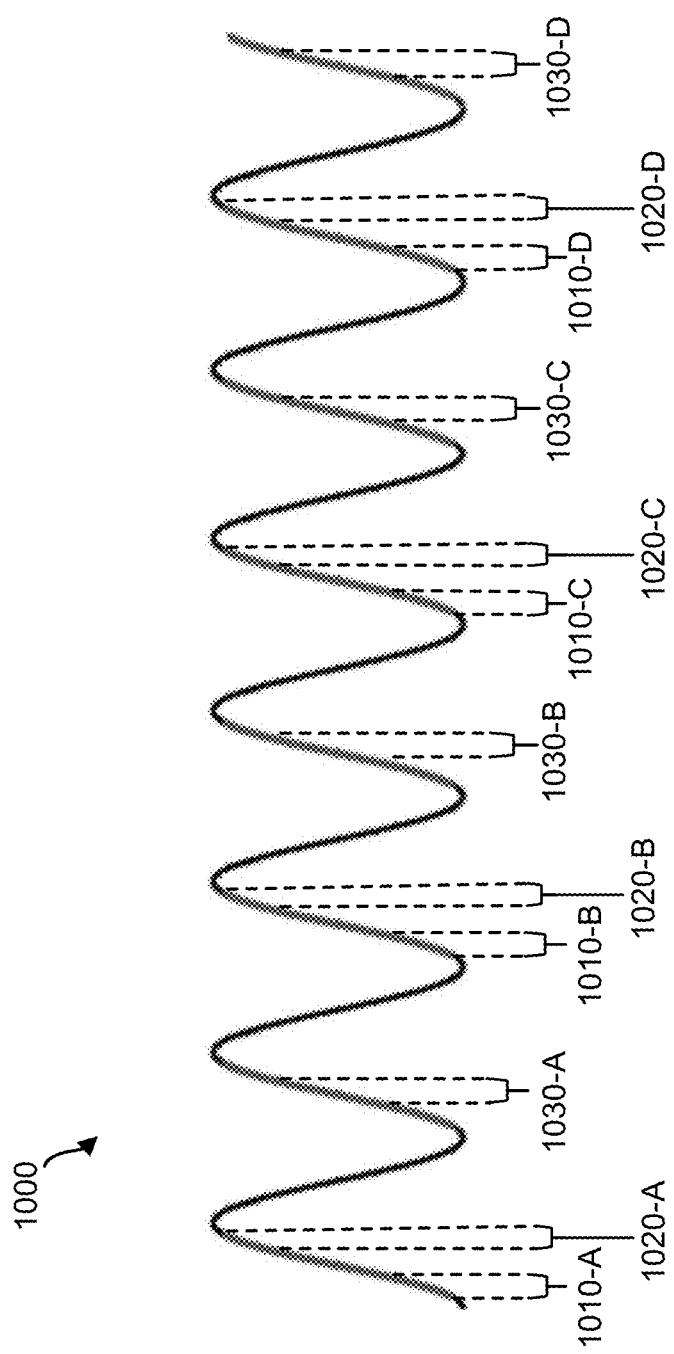
FIG. 10 shows a division of emission periods among different portions of a waveform, in accordance with an embodiment.

FIG. 10 shows a waveform 1000 for which the emission periods correspond to every rising portion. Emission on every other rising portion is also possible, as is emission on falling portions instead of rising portions. Emission can even be performed on both rising and falling portions, as long as the display system can operate fast enough. As shown in FIG. 10, only part of every rising portion is used for emission. In particular, the beginning and end segments are used for emission periods 1010 and 1020 on every other rising portion, alternating with the use of the center segments for emission periods 1030. The emission periods 1010, 1020, and 1030 correspond to the sub-periods 910, 920, and 930 in FIG. 9, respectively. Thus, emission can be performed in two phases: a first phase in which the beginning and end segments are used, and a second phase in which the center segment is used. These two phases correspond to different pulses, with the phases being repeated in alternating fashion.

The division of the emission time as shown in FIG. 10 is advantageous because the most uniform portion of the scan range is isolated from the less uniform portions. Further, although the beginning and end segments are non-linear, they are symmetric with respect to each other and thus the speed variations for the emission periods 1010 and 1020 are approximately the same. The data for emission periods 1010, 1020 can also be loaded at a different time than the data for emission period 1030, thereby reducing bandwidth consumption. In this manner, the circuitry that drives the emitters can settle at one frequency for the first phase and then have time to prepare for operation at a different frequency for the second phase. In comparison to dynamically adjusting for speed variation across the entire scan range, (1) it becomes easier to balance light output (e.g., the control scheme for adjusting emission durations of each row can be simplified) and (2) the lower bandwidth consumption means that more time is available for generating and supplying image data to the display. The emission periods 1010 and 1020 do not have to be equal in duration to the emission period 1030. Instead, the emission time can be divided according to the speed of the scanning assembly, which may depend on the shape of the waveform (e.g., the slopes of the rising portion). For instance, the emission periods 1010 and 1020 could each occupy 30% of the rise time while the emission period 1030 occupies 20% of the rise time.

The emission time can be further divided, for example, by splitting each of the emission periods 1010 and 1020 into two parts, splitting the emission period 1030 into three parts, and forming additional phases for the new parts in accordance with the grouping shown in FIG. 10 (i.e., pairing emission times for less linear segments together, with separate emission phases for more linear segments). Additionally, the emission time can be allocated equally among emitters of different colors, as discussed earlier in connection with FIG. 8. For example, the first set of emission periods 1010 to 1030 can be used for driving red emitters, then the next set of emission periods 1010 to 1030 can be used for driving green emitters, followed by a set of emission periods 1010 to 1030 for driving blue emitters.

Figure 11:
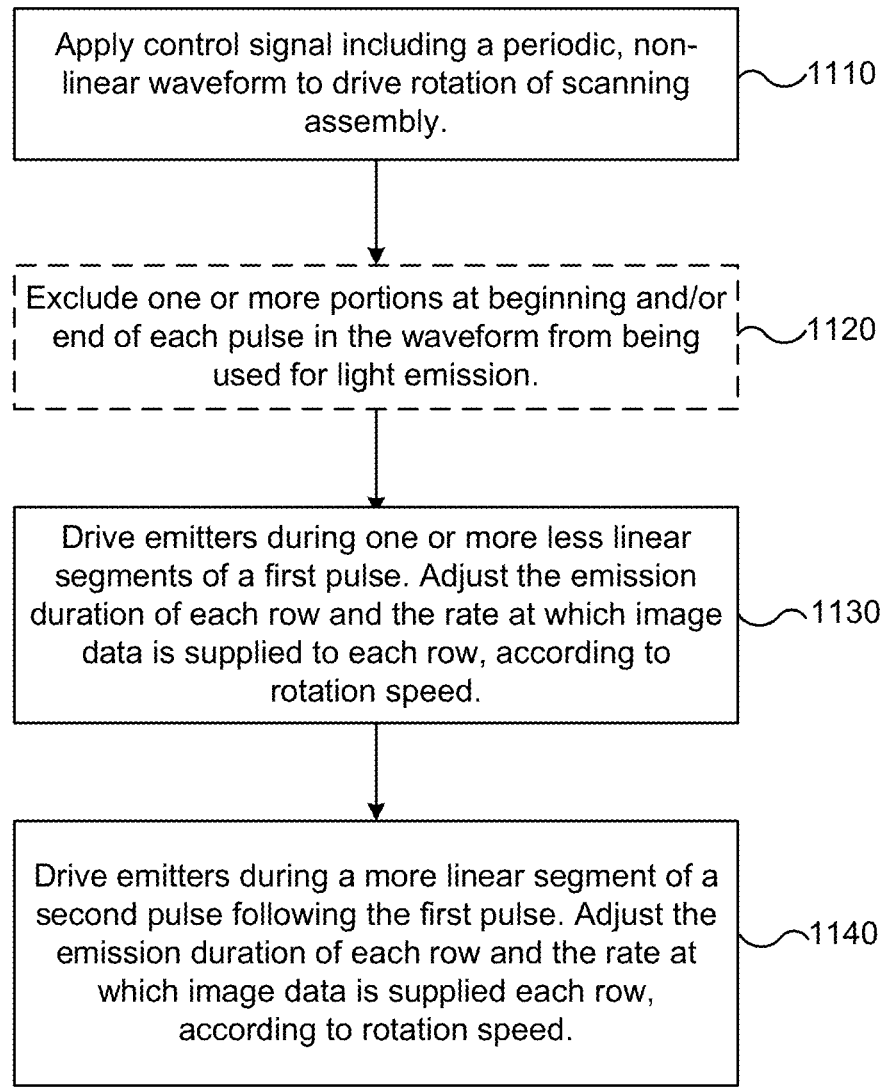
FIG. 11 is a flowchart of a method for operating a display system, in accordance with an embodiment.

FIG. 11 is a flowchart of a method 1100 for operating a display system that includes a scanning display, in accordance with an embodiment. The method 2100 can be performed using the display system 200. At step 1110, a control signal including a periodic, non-linear waveform is applied to drive the rotation of a scanning assembly. The control signal may, for example, be applied to cause one or more MEMS devices to oscillate a frequency matching that of the control signal, which in turn causes a scanning mirror or other reflective surface coupled to the MEMS devices to rotate through a range of scan angles at the same frequency.

At step 1120, one or more portions at the beginning or end of each pulse in the waveform is excluded from being used for light emission. For example, as described earlier, the top 10% and bottom 10% of each rising portion and/or pulse can be clipped for emission purposes. The controller 230 can output a non-clipped version of the waveform for driving the scanning assembly 280 while forming a clipped version of the waveform for use in determining emission times.

At step 1130, the emitters are driven during one or more less linear segments of a first pulse (e.g., during the emission periods 1010-A and 1020-A in FIG. 10). The emission durations of each row and the rate at which image data is supplied to the circuitry that drives each row can be adjusted according to the rotation speed during this time. For example, the display driver 232 may be configured to perform a first algorithm that dynamically adjusts the row time during the emission period 1010-A (e.g., through appropriate timing of row selection signals and corresponding data signals), then perform a second algorithm that implements an inverse row timing during the emission period 1020-B. The algorithms may be part of a control scheme designed specifically for use in conjunction with rotational movements produced in response to application of the less linear segments. The control scheme can be implemented in various ways including, for example, through a lookup table or based on a mathematical function that describes the angular position of the scanning assembly as a function of time. In some embodiments, the control scheme is based on the shape of the waveform. For example, the emission durations can be varied based on changes in the slope of the waveform, since slope is indicative of linearity. The slope can be calculated for a particular segment of a pulse (e.g., a segment of a rising or falling portion), as a slope of a tangent line of the control signal at a particular point in time, or based on multiple slopes of the control signal (e.g., an average slope along a particular segment). In general, emission durations are adjusted in inverse relationship to changes in slope. For example, when the slope decreases, the emission durations can be increased. When emission durations are increased, the rate at which data is supplied to each row can be correspondingly decreased since more time is available for sending data to the emitter drive circuitry.

At step 1140, the emitters are driven during a more linear segment of a second pulse (e.g., during the emission period 1030-A). As with step 1130, the rate at which image data is supplied to the circuitry that drives each row can be adjusted according to the rotation speed during this time. Since the rotation speed is more uniform in comparison the speed during the less linear segments, fewer adjustments may be needed. In some embodiments, the display driver may apply, for the more linear segment, a control scheme that assumes that the more linear segment is completely linear (e.g., by setting a uniform emission duration for every row based on the average slope of the more linear segment). Steps 1120 to 1140 can be repeated while continuing to apply the control signal to drive the scanning assembly, until one or more complete output images have been formed. The above described adjustments to emission durations and data rates can be performed irrespective of whether the emission times are divided among different phases and irrespective of whether the waveform is clipped. In general, whenever a non-linear control signal is applied to effect rotation of a scanning assembly, emission timing can be dynamically adjusted to compensate for changes in rotation speed.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently. In some embodiments, a software module is implemented with a computer program product comprising a computer-readable medium containing computer program code, which can be executed by one or more computer processors for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for forming an output image, comprising:
   rotating a reflective surface using a control signal, wherein the control signal is a periodic waveform comprising non-linear pulses, and wherein a rotational speed of the reflective surface depends on a slope of the pulses in the control signal;
   driving a plurality of emitters in sequence and using a same image data value, wherein the image data value determines a brightness of light emitted by each emitter driven using the image data value, wherein each emitter of the plurality of emitters corresponds to a separate row in a column, and wherein the driving of the plurality of emitters is performed in synchronization with the rotating of the reflective surface such that light emitted by different emitters of the plurality of emitters is reflected onto a same pixel of the output image; and
   compensating for changes in the rotational speed of the reflective surface, wherein the compensating comprises increasing an emission duration for a first row driven while the reflective surface is rotating at a slower rotational speed, relative to an emission duration for a second row driven while the reflective surface is rotating at a faster rotational speed.

2. The method of claim 1, wherein the compensating further comprises:
   adjusting, in correspondence with changes in emission duration, a rate at which image data is supplied for driving individual rows in the column, wherein the adjusting comprises decreasing a rate at which the image data is supplied for driving the first row relative to a rate at which the image data is supplied for driving the second row.

3. The method of claim 1, wherein the pulses of the control signal are sinusoidal, the method further comprising:
confining the driving of the plurality of emitters to a more linear portion of the pulses, wherein the confining comprises preventing emitters from being driven during a top portion and a bottom portion of each pulse in the control signal.

4. The method of claim 1, wherein the pulses of the control signal are sinusoidal, each pulse including a first portion, a second portion, and a third portion, wherein the first portion and the second portion are symmetric and less linear than the third portion, wherein the driving of the plurality of emitters is performed during the first portion and the second portion of a first set of pulses and during the third portion of a second set of pulses, and wherein the first set of pulses is separate from the second set of pulses.

5. The method of claim 4, further comprising:
loading image data for emission periods corresponding to the first portion and the second portion of a first pulse at a different time than image data for an emission period corresponding to the third portion of a second pulse.

6. The method of claim 1, wherein the rotating of the reflective surface comprises applying the control signal to cause a microelectromechanical systems (MEMS) device to resonate at a particular frequency.

7. The method of claim 1, wherein the driving of the plurality emitters is performed during a rising or falling portion of every other pulse in the control signal such that the rising or falling portions of consecutive pulses correspond to an emission period followed by a non-emission period.

8. The method of claim 1, wherein the emitters of the plurality of emitters are of a same color, the method further comprising:
driving the plurality of emitters during a first sub-period of an emission period corresponding to a first pulse; and
driving a second plurality of emitters that are of a different color, during a second sub-period of the emission period corresponding to the first pulse.

9. The method of claim 1, wherein the emitters of the plurality of emitters are of a same color, the method further comprising:
driving the plurality of emitters during emission periods corresponding to a first set of pulses; and
driving a second plurality of emitters that are of a different color, during emission periods corresponding to a second set of pulses that follow the first set of pulses.

10. A display system, comprising:
a light source including a plurality of emitters arranged in a column, wherein each emitter of the plurality of emitters corresponds to a separate row in the column;
a scanning assembly including a reflective surface facing the light source, the reflective surface being rotatable in at least one dimension; and
a controller configured to:
rotate the reflective surface using a control signal, wherein the control signal is a periodic waveform comprising non-linear pulses, and wherein a rotational speed of the reflective surface depends on a slope of the pulses in the control signal;
drive the plurality of emitters in sequence and using a same image data value, wherein the image data value determines a brightness of light emitted by each emitter driven using the image data value, and wherein the plurality of emitters is driven in synchronization with rotation of the reflective surface such that light emitted by different emitters of the plurality of emitters is reflected onto a same pixel of an output image; and
compensate for changes in the rotational speed of the reflective surface through increasing an emission duration for a first row driven while the reflective surface is rotating at a slower rotational speed, relative to an emission duration for a second row driven while the reflective surface is rotating at a faster rotational speed.

11. The display system of claim 10, wherein to compensate for changes in the rotational speed of the reflective surface, the controller is configured to:
adjust, in correspondence with changes in emission duration, a rate at which image data is supplied for driving individual rows in the column, wherein the adjusting comprises decreasing a rate at which the image data is supplied for driving the first row relative to a rate at which the image data is supplied for driving the second row.

12. The display system of claim 10, wherein the pulses of the control signal are sinusoidal, and wherein the controller is further configured to:
confine the driving of the plurality of emitters to a more linear portion of the pulses, wherein the confining comprises preventing emitters from being driven during a top portion and a bottom portion of each pulse in the control signal.

13. The display system of claim 10, wherein the pulses of the control signal are sinusoidal, each pulse including a first portion, a second portion, and a third portion, wherein the first portion and the second portion are symmetric and less linear than the third portion, wherein the controller is configured to drive the plurality of emitters during the first portion and the second portion of a first set of pulses and during the third portion of a second set of pulses, and wherein the first set of pulses is separate from the second set of pulses.

14. The display system of claim 13, wherein the controller is further configured to:
load image data for emission periods corresponding to the first portion and the second portion of a first pulse at a different time than image data for an emission period corresponding to the third portion of a second pulse.

15. The display system of claim 10, wherein to rotate the reflective surface, the controller is configured to apply the control signal to cause a microelectromechanical systems (MEMS) device to resonate at a particular frequency.

16. The display system of claim 10, wherein the controller is further configured to drive the plurality emitters during a rising or falling portion of every other pulse in the control signal such that the rising or falling portions of consecutive pulses correspond to an emission period followed by a non-emission period.

17. The display system of claim 10, wherein the emitters of the plurality of emitters are of a same color, and wherein the controller is further configured to:
drive the plurality of emitters during a first sub-period of an emission period corresponding to a first pulse; and drive a second plurality of emitters that are of a different color, during a second sub-period of the emission period corresponding to the first pulse.

18. The display system of claim 10, wherein the emitters of the plurality of emitters are of a same color, and wherein the controller is further configured to:
  drive the plurality of emitters during emission periods corresponding to a first set of pulses; and
  drive a second plurality of emitters that are of a different color, during emission periods corresponding to a second set of pulses that follow the first set of pulses.

19. A non-transitory computer readable storage medium storing instructions that, when executed by one or more processors of a computer system, cause the one or more processors to:
  rotate a reflective surface using a control signal, wherein the control signal is a periodic waveform comprising non-linear pulses, and wherein a rotational speed of the reflective surface depends on a slope of the pulses in the control signal;
  drive a plurality of emitters in sequence and using a same image data value, wherein the image data value determines a brightness of light emitted by each emitter driven using the image data value, wherein each emitter of the plurality of emitters corresponds to a separate row in a column, and wherein the driving of the plurality of emitters is performed in synchronization with the rotating of the reflective surface such that light emitted by different emitters of the plurality of emitters is reflected onto a same pixel of an output image; and
  compensate for changes in the rotational speed of the reflective surface, wherein the compensating comprises increasing an emission duration for a first row driven while the reflective surface is rotating at a slower rotational speed, relative to an emission duration for a second row driven while the reflective surface is rotating at a faster rotational speed.

20. The non-transitory computer readable storage medium of claim 19, wherein to compensate for changes in the rotational speed of the reflective surface, the instructions cause the one or more processors to:
  adjust, in correspondence with changes in emission duration, a rate at which image data is supplied for driving individual rows in the column, wherein the adjusting comprises decreasing a rate at which the image data is supplied for driving the first row relative to a rate at which the image data is supplied for driving the second row.

* * * * *